(12) United States Patent
Takaki et al.

(10) Patent No.: US 12,247,755 B2
(45) Date of Patent: Mar. 11, 2025

(54) AIR CONDITIONING SYSTEM AND METHOD

(71) Applicant: DAIKIN INDUSTRIES, LTD., Osaka (JP)

(72) Inventors: Kentarou Takaki, Osaka (JP); Nobuyoshi Kawakami, Osaka (JP); Nao Okada, Osaka (JP); Hiroko Kashimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 357 days.

(21) Appl. No.: 17/760,036

(22) PCT Filed: Dec. 1, 2020

(86) PCT No.: PCT/JP2020/044723
§ 371 (c)(1),
(2) Date: Aug. 3, 2022

(87) PCT Pub. No.: WO2021/161624
PCT Pub. Date: Aug. 19, 2021

(65) Prior Publication Data
US 2023/0044208 A1 Feb. 9, 2023

(30) Foreign Application Priority Data
Feb. 12, 2020 (JP) .................. 2020-021753

(51) Int. Cl.
*F24F 11/58* (2018.01)
*F24F 11/49* (2018.01)
(Continued)

(52) U.S. Cl.
CPC .............. *F24F 11/58* (2018.01); *F24F 11/49* (2018.01); *F24F 11/52* (2018.01); *F24F 11/54* (2018.01)

(58) Field of Classification Search
CPC .. F24F 11/58; F24F 11/49; F24F 11/52; F24F 11/54; G05B 2219/2614; G05B 15/02
See application file for complete search history.

(56) References Cited

U.S. PATENT DOCUMENTS

2008/0224834 A1* 9/2008 Oosaka ............... H04L 12/2803
340/286.02
2011/0291794 A1* 12/2011 Lee ......................... H02J 3/008
340/3.1
(Continued)

FOREIGN PATENT DOCUMENTS

JP 2016-191519 11/2016
KR 10-2005-0015344 2/2005
(Continued)

OTHER PUBLICATIONS

International Preliminary Report on Patentability for PCT/JP2020/044723 mailed on Aug. 25, 2022.
(Continued)

*Primary Examiner* — Ziaul Karim
(74) *Attorney, Agent, or Firm* — IPUSA, PLLC (57) ABSTRACT

A system includes a use side device of an air conditioner; a terminal; and a management server, wherein the terminal transmits first information for identifying the use side device installed in a predetermined property to the management server, and wherein the management server stores second information as information on a use side device to be installed in the predetermined property, and based on the first information and the second information received from the terminal, the management server determines whether the use side device installed in the predetermined property matches the use side device to be installed in the predetermined property.

3 Claims, 3 Drawing Sheets

(51) Int. Cl.
  *F24F 11/52* (2018.01)
  *F24F 11/54* (2018.01)

(56) References Cited

U.S. PATENT DOCUMENTS

| | | | | |
|---|---|---|---|---|
| 2014/0067094 | A1* | 3/2014 | Park | H04W 12/06 |
| | | | | 700/90 |
| 2014/0067131 | A1* | 3/2014 | Park | D06F 34/05 |
| | | | | 700/275 |
| 2014/0081433 | A1* | 3/2014 | Cheong | H04L 12/2809 |
| | | | | 700/90 |
| 2014/0156081 | A1* | 6/2014 | Ha | G05B 15/02 |
| | | | | 700/275 |
| 2018/0142913 | A1* | 5/2018 | Katori | F24F 11/30 |
| 2019/0101304 | A1* | 4/2019 | Yoon | F24F 11/62 |
| 2019/0394278 | A1* | 12/2019 | Fujimoto | G06Q 50/16 |

FOREIGN PATENT DOCUMENTS

| | | |
|---|---|---|
| KR | 10-1860920 | 5/2018 |
| KR | 10-1959507 | 3/2019 |

OTHER PUBLICATIONS

International Search Report for PCT/JP2020/044723 mailed on Feb. 22, 2021.
Extended European Search Report for EP20919326.7 dated Jun. 15, 2023.

* cited by examiner

AIR CONDITIONING SYSTEM AND METHOD

TECHNICAL FIELD

The present disclosure relates to an air conditioning system and a method.

BACKGROUND ART

Conventionally, regarding installation of an air conditioner, a check system for checking whether the installation has been appropriately performed has been disclosed (see Patent Document 1).

RELATED ART DOCUMENTS

Patent Documents

[Patent Document 1] Japanese Laid-Open Patent Application No. 2016-191519

SUMMARY OF THE INVENTION

Problem to be Solved by the Invention

However, in Patent Document 1, the operator merely enters check marks into check boxes of confirmation items, and it is not possible to determine whether the air conditioner is actually installed correctly. An object in the present disclosure is to determine whether installation of an air conditioner is appropriate.

Means for Solving Problem

A system according to a first aspect in the present disclosure is a system that includes a use side device of an air conditioner; a terminal; and a management server, wherein the terminal transmits first information for identifying the use side device installed in a predetermined property to the management server, and wherein the management server stores second information as information on a use side device to be installed in the predetermined property, and based on the first information and the second information received from the terminal, the management server determines whether the use side device installed in the predetermined property matches the use side device to be installed in the predetermined property.

According to the first aspect in the present disclosure, it is possible to determine whether installation of the use side device of the air conditioner is appropriate.

Also, a second aspect in the present disclosure is the system as described in the first aspect, wherein the management server transmits an error to the terminal in a case where the use side device installed in the predetermined property does not match the use side device to be installed in the predetermined property.

According to the second aspect in the present disclosure, it becomes possible for the user to recognize that the use side device to be installed in the property is not installed.

Also, a third aspect in the present disclosure is the system as described in the first aspect or the second aspect that further includes a remote controller being connected to the use side device, wherein the remote controller receives information for identifying the use side device from the use side device, and transmits the received information for identifying the use side device to the terminal, and wherein the terminal receives the information for identifying the use side device from the remote controller, and generates the first information.

According to the third aspect in the present disclosure, it becomes possible to determine whether connection between the use side device of the air conditioner and the remote controller is appropriate.

Also, a fourth aspect in the present disclosure is the system as described in the third aspect, wherein the information for identifying the use side device is one of an appliance ID, a lot number, or a model name of the use side device.

According to the fourth aspect in the present disclosure, the terminal can identify the use side device connected to the remote controller based on any one of the appliance ID, the lot number, and the model name of the use side device of the air conditioner.

Also, a fifth aspect in the present disclosure is the system as described in the third aspect or the fourth aspect, wherein the remote controller is connected to a plurality of use side devices.

According to the fifth aspect in the present disclosure, the terminal can identify multiple use side devices connected to the remote controller.

Also, a sixth aspect in the present disclosure is the system as described in any one of the third to fifth aspects, wherein the terminal transmits an address of the use side device to the remote controller after having received the information for identifying the use side device.

According to the sixth aspect in the present disclosure, the terminal can identify the use side device connected to the remote controller, and then, can set the address of the use side device of the air conditioner in the remote controller. For example, instead of inputting the name of the use side device of the air conditioner, the user can set the address using information for identifying the use side device obtained from the remote controller.

Also, a seventh aspect in the present disclosure is the system as described in the sixth aspect, wherein the terminal displays a screen for a user to set the address of the use side device such that on the screen, a display form of an address that has been set and a display form of an address yet to be set are displayed differently.

According to the seventh aspect in the present disclosure, it becomes possible for the user to visually recognize an address that has not been set yet.

A method according to an eighth aspect in the present disclosure is a method executed by a management server, that includes a step of receiving first information for identifying a use side device installed in a predetermined property from a terminal; and a step of determining whether the use side device installed in the predetermined property matches a use side device to be installed in the predetermined property, based on the first information received from the terminal and second information stored in the management server, the second information being information on the use side device to be installed in the predetermined property.

EMBODIMENTS FOR CARRYING OUT THE INVENTION

In the following, embodiments in the present disclosure will be described based on the drawings.

<Description of Terms>

"Information for identifying a use side device (also referred to as an indoor unit) of an air conditioner" is information for uniquely identifying the use side device (e.g., the appliance ID or the like of the use side device). Also, the information for identifying the use side device of the air conditioner may be various types of items of information (e.g., the lot number of the use side device, the model name of the use side device, or the like) with which the use side device can be identified.

"The address of a use side device (also referred to as an indoor unit) of an air conditioner" is information for uniquely identifying the use side device by a monitoring system or the like of the air conditioner.

<System Configuration>

Figure 1:
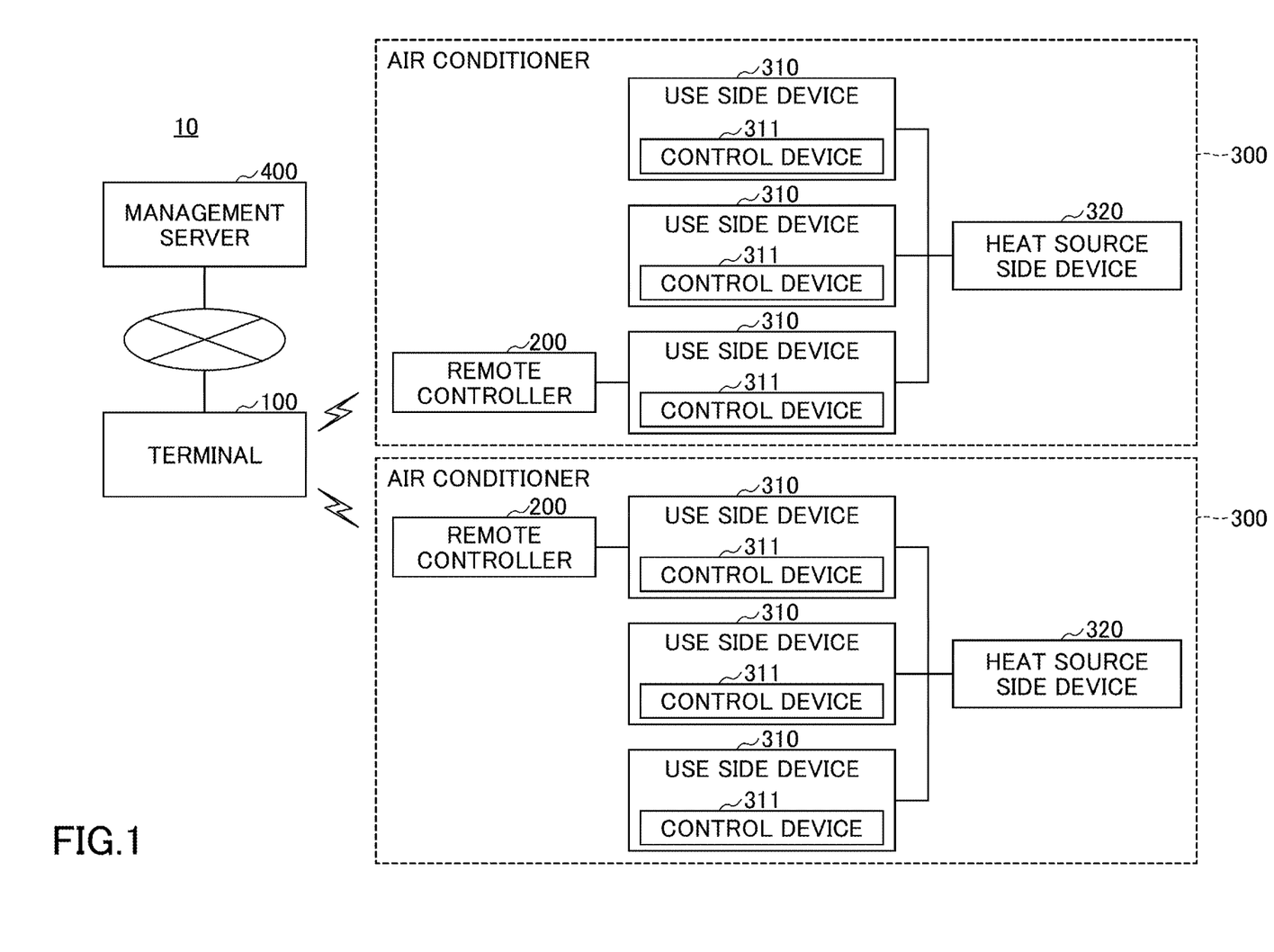
FIG. 1 is a diagram illustrating an overall configuration according to one embodiment in the present disclosure.

FIG. 1 is a diagram illustrating an overall configuration according to the one embodiment in the present disclosure. An air conditioning system 10 includes a terminal 100, air conditioners 300, and a management server 400. In the following, the respective components will be described.

<<Air Conditioner 300>>

The air conditioner 300 is an air conditioner of any type. Each of the air conditioners 300 includes one or more use side devices (also referred to as indoor units) 310, a heat source side device (also referred to as an outdoor unit) 320, and a remote controller 200. Also, each of the use side devices 310 includes a control device 311. The control device 311 can transmit information for identifying the use side device 310 to the remote controller 200.

The air conditioner 300 is operated by using the remote controller 200. For example, as illustrated in FIG. 1, the remote controller 200 is connected to one of the multiple use side devices 310 each connected to the heat source device 320.

Note that in the present specification, "the remote controller 200 being connected with the use side device 310" includes a case of the remote controller 200 being directly connected with the use side device 310, and also includes a case of the remote controller 200 being connected with the use side device 310 via another use side device (i.e., the remote controller 200 and the use side device 310 are not directly connected).

<<Remote Controller 200>>

The remote controller 200 is an appliance to operate one or more air conditioners 300. The remote controller 200 is connected to one or more use side devices 310 by wiring. Note that as described above, the remote controller 200 being connected with the use side device 310 includes a case of the remote controller 200 being directly connected with the use side device 310, and also includes a case where the remote controller 200 being connected with the use side device 310 via another use side device (i.e., the remote controller 200 and the use side device 310 are not directly connected). Also, the remote controller 200 can transmit and receive data to and from the terminal 100 via Bluetooth (registered trademark) or the like.

Specifically, the remote controller 200 receives information for identifying a use side device 310 from the control device 311 of the use side device 310 of the air conditioner 300. Also, the remote controller 200 transmits the information for identifying the use side device 310 received from the use side device 310 to the terminal 100.

<<Terminal 100>>

The terminal 100 is, for example, an appliance such as a smartphone, a tablet, a personal computer, or the like. The terminal 100 can transmit and receive data to and from the remote controller 200 via Bluetooth or the like. Also, the terminals 100 can transmit and receive data to and from the management servers 400 via a wireless communication system such as 3G, 4G, 5G, or the like.

Specifically, the terminal 100 receives information for identifying a use side device 310 connected to the remote controller 200 from the remote controller 200. Also, the terminal 100 transmits the information for identifying the use side device 310 received from the remote controller 200 to the management server 400.

<<Management server 400>>

The management server 400 is a server to manage information on use side devices installed in respective properties (e.g., respective buildings, respective floors in the buildings, and the like). The management server 400 receives information for identifying a use side device 310 connected to a remote controller 200 from the terminal 100, and determines whether the use side device 310 of the air conditioner 300 is correctly connected with the remote controller 200.

<Hardware Configuration of Terminal 100, Remote Controller 200, or Management Server 400>

Figure 2:
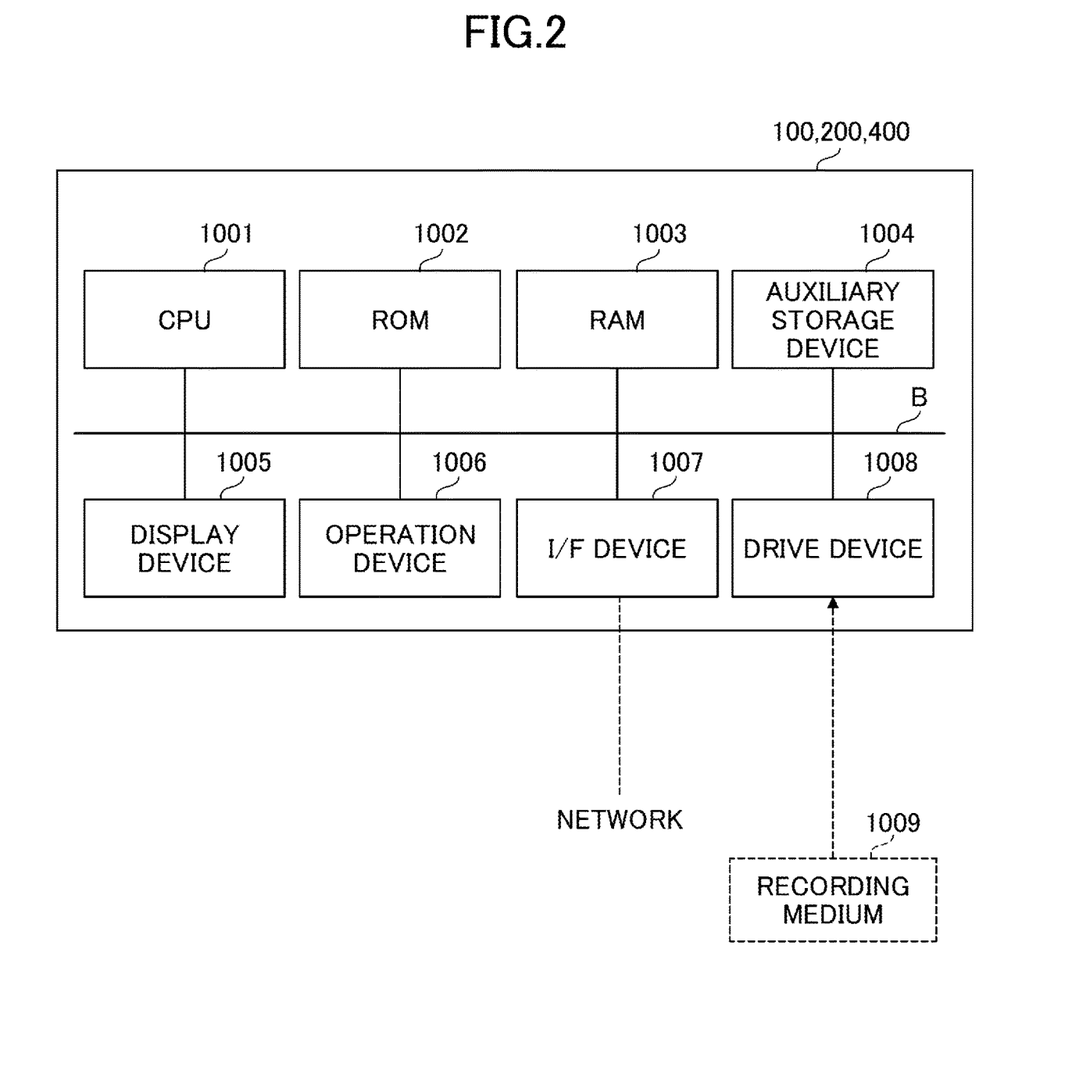
FIG. 2 is a diagram illustrating a hardware configuration of a terminal, a remote controller, or a management server according to the one embodiment in the present disclosure.

FIG. 2 is a diagram illustrating a hardware configuration of the terminal 100, the remote controller 200, or the management server 400 according to the one embodiment in the present disclosure. The terminal 100, the remote controller 200, or the management server 400 includes a central processing unit (CPU) 1001, a read-only memory (ROM) 1002, and a random access memory (RAM) 1003. The CPU 1001, the ROM 1002, and the RAM 1003 configures a what-is-called computer.

Also, the terminal 100, the remote controller 200, or the management server 400 may include an auxiliary storage device 1004, a display device 1005, an operation device 1006, an interface (I/F) device 1007, and a drive device 1008. Note that the respective hardware components in the terminal 100, the remote controller 200, or the management server 400 are connected to each other via a bus B.

The CPU 1001 is an arithmetic/logic device to execute various types of programs installed in the auxiliary storage device 1004.

The ROM 1002 is a non-volatile memory. The ROM 1002 functions as a main memory device to store the various types of programs, data, and the like necessary for the CPU 1001 to execute the various types of programs installed in the auxiliary storage device 1004. Specifically, the ROM 1002 functions as a main memory device to store a boot program such as a basic input/output system (BIOS) or an extensible firmware interface (EFI).

The RAM 1003 is a volatile memory such as a dynamic random access memory (DRAM) or a static random access memory (SRAM). The RAM 1003 functions as a main memory device that provides a work area in which the various types of programs installed in the auxiliary storage device 1004 are loaded when the programs are executed by the CPU 1001.

The auxiliary storage device 1004 is an auxiliary storage device to store the various types of programs and information used when the various types of programs are executed.

The display device 1005 is a display device to display internal states and the like of the terminal 100, the remote controller 200, or the management server 400.

The operation device 1006 is an input device through which a user of the terminal 100, the remote controller 200, or the management server 400 inputs various types of commands to the terminal 100, the remote controller 200, or the management server 400.

The I/F device 1007 is a communication device that is connected to a network to communicate with the terminal 100, the remote controller 200, the management server 400, and the like.

The drive device 1008 is a device for setting a recording medium 1009. The recording medium 1009 here includes a medium that optically, electrically, or magnetically records information, such as a CD-ROM, a flexible disk, and a magneto-optical disk. Also, the recording medium 1009 may include a semiconductor memory or the like that electrically records information, such as a ROM or a flash memory.

Note that the various types of programs to be installed in the auxiliary storage device 1004 are installed, for example, by setting a distributed recording medium 1009 in the drive device 1008 and reading the various types of programs recorded on the recording medium 1009 by the drive device 1008. Alternatively, the various types of programs to be installed in the auxiliary storage device 1004 may be installed by downloading from a network via the I/F device 1007.

<Terminal 100>

In the following, processing executed by the terminal 100 will be described. Specifically, the following processing is executed by the CPU 1001 of the terminal 100 executing a program.

The terminal 100 receives information (e.g., the appliance ID or the like of the use side device 310) for identifying a use side device 310 connected to the remote controller 200 from the remote controller 200. The terminal 100 can display the information for identifying the user side device 310 (e.g., the appliance ID or the like of the use side device 310) received from the remote controller 200.

The terminal 100 displays a screen for the user to set the address of the use side device 310 of the air conditioner 300. Note that on this screen, a display form of an address that has been set and a display form of an address yet to be set may be displayed differently (e.g., grayed-out, highlighted, etc.). The user sets the address of the user side device 310 on this screen. The terminal 100 transmits the address of the use side device 310 set by the user to the remote controller 200.

The terminal 100 transmits first information for identifying the use side device 310 installed in a predetermined property to the management server 400. Specifically, the terminal 100 receives information (e.g., the appliance ID or the like of the use side device 310) for identifying the use side device 310 connected to the remote controller 200 from the remote controller 200. Based on the information for identifying the use side device 310 received from the remote controller 200, the terminal 100 generates information for identifying the use side device 310 installed in the predetermined property (also referred to as the first information). The terminal 100 transmits the first information for identifying the use side device 310 installed in the predetermined property and information for identifying the property to the management server 400, and requests the management server 400 to determine whether the use side device 310 is correctly connected to the remote controller 200 to be connected. In the case where the two records of information do not match, the terminal 100 can receive an error from the management server 400 to display the error or the like.

<Remote Controller 200>

In the following, processing executed by the remote controller 200 will be described. Specifically, the following processing is executed by the CPU 1001 of the remote controller 200 executing a program.

The remote controller 200 receives information for identifying a user side device 310 (e.g., the appliance ID or the like of the use side device 310) from the control device 311 of the user side device 310 connected to the remote controller 200.

The remote controller 200 transmits, to the terminal 100, the information for identifying the user side device 310 (e.g., the appliance ID or the like of the use side device 310) received from the control device 311 of the user side device 310.

The remote controller 200 sets the address of the use side device 310 set by the user on the terminal 100. Specifically, the remote controller 200 receives the address of the user side device 310 from the terminal 100, and stores the address of the user side device 310 in the remote controller 200.

<Management Server 400>

In the following, processing executed by the management server 400 will be described. Specifically, the following processing is executed by the CPU 1001 of the management server 400 executing a program.

The management server 400 stores information on each use side device to be installed in each predetermined property (also referred to as second information). Specifically, in the auxiliary storage device 1004 or the like of the management server 400, information on the use side device (e.g., the appliance ID of the use side device, the lot number of the use side device, the model name of the use side device, or the like) installed in each of the properties (e.g., each building, each floor in the building, or the like) is stored. In other words, for each of the properties, information for identifying one or more use side devices to be installed in the property (e.g., the appliances ID of the use side devices, the lot numbers of the use side devices, the model names of the use side devices, or the like) is managed.

The management server 400 receives the first information for identifying a use side device 310 installed in a predetermined property from the terminal 100. Also, the management server 400 receives information for identifying the property from the terminal 100.

Based on the first information and the second information received from the terminal 100, the management server 400 determines whether the use side device 310 installed in the predetermined property matches the use side device 310 to be installed in the predetermined property. In other words, the management server 400 determines whether the use side device 310 connected to the remote controller 200 matches the use side device to be installed in the predetermined property. Specifically, based on the information for identifying the property received from the terminal 100, the management server 400 refers to the auxiliary storage device 1004 or the like of the management server 400. Then, the management server 400 collates the information for identifying the use side device 310 received from the terminal 100 (e.g., the appliance ID or the like of the use side device 310) with the information on the use side device to be installed in the property referenced in the auxiliary storage device 1004 or the like of the management server 400 (e.g., the appliance ID or the like of the use side device 310).

If the two match, the management server 400 determines that the use side device 310 is correctly connected with the remote controller 200 to be connected. Also, if the two do not match, the management server 400 determines that the use side device 310 is not correctly connected with the remote controller 200 to be connected (i.e., the use side device 310 to be connected is not connected, or the use side device 310 not to be connected is connected).

If it is determined that the two do not match, the management server 400 transmits an error to the terminal 100. Specifically, in the case where the use side device 310 connected to the remote controller 200 does not match the use side device to be installed in the predetermined property, the management server 400 transmits an error to the terminal 100.

<Processing Method>

Figure 3:
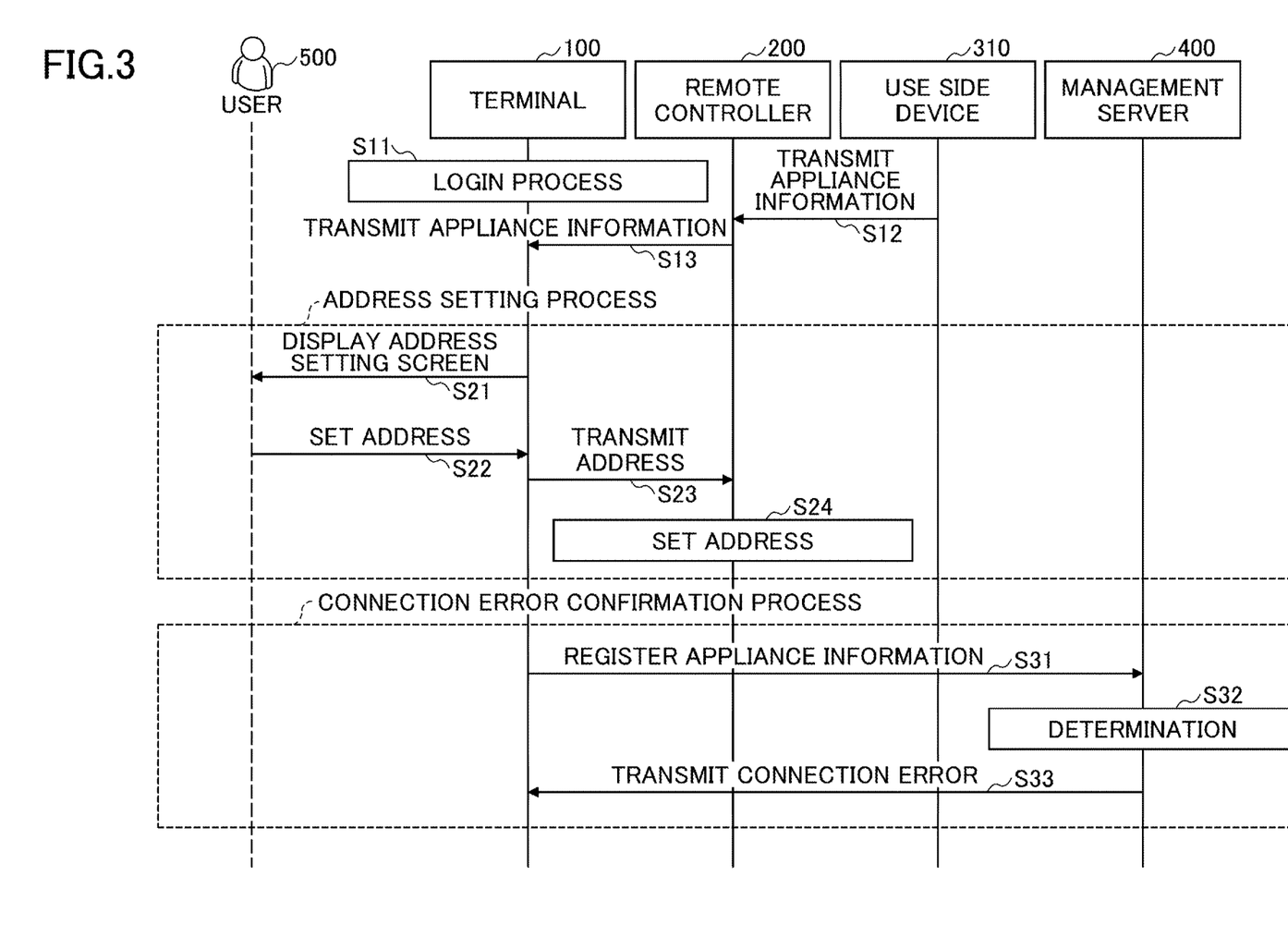
FIG. 3 is a sequence chart of processing of obtaining information for identifying a use side device of an air conditioner according to the one embodiment in the present disclosure.

FIG. 3 is a sequence chart of processing of obtaining information for identifying a use side device 310 of an air conditioner 300 according to the one embodiment in the present disclosure. It is assumed that a user 500 (e.g., a person who performs setting operations on the remote controller 200 of the air conditioner 300 at a site where the use side device 310 and the remote controller 200 of the air conditioner 300 are installed) operates the terminal 100.

In the following, the processing will be described separately for <<Obtainment of information for identifying the user-side device 310>>, <<Address setting>>, and <<Connection error checking>>. Note that only processing of <<Address setting>> may be executed after processing of <<Obtainment of information for identifying the user-side device 310>>, or only processing of <<Connection error checking>> may be executed after processing of <<Obtainment of information for identifying the user-side device 310>>. Also, the processing may be executed in order of <<Obtainment of information for identifying the user-side device 310>>, <<Address setting>>, and <<Connection error checking>>, or may be executed in order of <<Obtainment of information for identifying the user-side device 310>>, <<Connection error checking>>, and <<Address setting>>.

<<Obtainment of Information for Identifying the User-Side Device 310>>

It is assumed that at Step 11 (S11), the user 500 logs in to a program according to the one embodiment in the present disclosure (e.g., a smartphone application installed in the terminal 100).

At Step 12 (S12), the control device 311 of the user side device 310 transmits information for identifying itself (e.g., the appliance ID or the like of the use side device 310) to the remote controller 200. Next, the remote controller 200 receives information for identifying the user side device 310 (e.g., the appliance ID or the like of the use side device 310) from the control device 311 of the user side device 310.

At Step 13 (S13), the remote controller 200 transmits the information for identifying the use side device 310 received at S12 (e.g., the appliance ID or the like of the use side device 310) to the terminals 100. Next, the terminal 100 receives the information for identifying the user side device 310 (e.g., the appliance ID or the like of the use side device 310) from the remote controller 200.

Note that the terminal 100 may be configured to display the information for identifying the user side device 310 received from the remote controller 200 (e.g., the appliance ID or the like of the use side device 310).

In this way, in the one embodiment in the present disclosure, it becomes easier on the terminal 100 to identify a user side device 310 connected to a remote controller 200. For example, even if the display device 2003 of the remote controller 200 is designed to be incapable of displaying characters and the like, by displaying the appliance ID, the lot number, the model name or the like of the use side device 310 on the display device 1005 of the terminal 100, the user 500 can identify the use side device 310 connected to the remote controller 200.

<<Address Setting>>

At Step 21 (S21), the terminal 100 displays a screen for the user 500 to set the address of the use side device 310 of the air conditioner 300. Note that on this screen, the display form of an address that has been set and the display form of an address yet to be set may be displayed differently (e.g., grayed-out or highlighted).

At Step 22 (S22), the user 500 sets the address of the use side device 310 on the screen displayed at S21. For example, the user 500 selects an address to be allocated to the use side device 310 from among multiple addresses on the screen displayed at S21.

At Step 23 (S23), the terminal 100 transmits the address set at S22 to the remote controller 200. Next, the remote controller 200 receives the address of the use side device 310 from the terminal 100.

At Step 24 (S24), the remote controller 200 stores the address of the user side device 310 received from the terminal 100, in the remote controller 200.

In this way, in the one embodiment in the present disclosure, a user (e.g., a person who performs setting operations on the remote controller 200 of the air conditioner 300 at the site where the use side device 310 and the remote controller 200 of the air conditioner 300 are installed) can identify the user side device 310 that is actually connected to the remote controller 200, and then, by using the terminal 100, can set the address of the user side device 310 to the remote controller 200.

<<Connection Error Checking>>

At Step 31 (S31), the terminal 100 transmits the first information for identifying the use side device 310 installed in the predetermined property to the management server 400. Specifically, based on the information (e.g., the appliance ID or the like of the use side device 310) for identifying the use side device 310 connected to the remote controller 200 received at S13, the terminal 100 generates information for identifying the use side device 310 installed in the predetermined property. Next, the terminal 100 transmits the first information for identifying the use side device 310 installed in the predetermined property and information for identifying the property to the management server 400. Next, the management server 400 receives the first information for identifying the use side device 310 installed in the predetermined property and the information for identifying the property from the terminal 100.

At Step 32 (S32), based on the information for identifying the property received at S31, the management server 400 refers to information on each use side device to be installed in the property stored in the auxiliary storage device 1004 or the like. The management server 400 collates the information for identifying the use side device received at S31 with the information on the use side device to be installed in the property referenced in the auxiliary storage device 1004 or the like. If the two match, the management server 400 determines that the use side device 310 is correctly connected with the remote controller 200 to be connected. If the two do not match, the management server 400 determines that the use side device 310 is not correctly connected with the remote controller 200 to be connected (i.e., the use side device 310 to be connected is not connected, or the use side device 310 not to be connected is connected).

As described above, the management server 400 includes the auxiliary storage device 1004 or the like in which information on each use side device (e.g., the appliance ID or the like of the use side device 310) to be installed in each property is stored. The management server 400 collates the information (e.g., the appliance ID or the like of the use side device 310) for identifying the use side device 310 received at S31 with the information (e.g., the appliance ID or the like of the use side device 310) of the use side device to be installed in the property stored in the auxiliary storage device 1004 or the like.

At Step 33 (S33), if it is determined at S32 that the two do not match, the management server 400 transmits an error to the terminal 100. Next, the terminal 100 executes, for example, displaying the error received from the management server 400.

In this way, in the one embodiment in the present disclosure, it is possible to determine whether a use side device 310 is correctly connected with a remote controller 200 to be connected, by collating the information for identifying the use side device 310 (i.e., the information for identifying the use side device 310 that is actually connected to the remote controller 200) obtained by the terminal 100 from the remote controller 200, with the information on each use side device to be installed in a predetermined property (i.e., the use side device to be installed in the property (e.g., a site where the user 500 is performing setting operations on the remote controller 200)).

As above, the embodiments have been described; it can understood that various changes in form and detail are possible without deviating from the gist and scope of the claims.

The present application claims priority to Japanese Patent Application No. 2020-021753 filed on Feb. 12, 2020, the entire contents of which are incorporated herein by reference.

LIST OF REFERENCE NUMERALS

10 air conditioning system
100 terminal
200 remote controller
300 air conditioner
310 use side device
311 control device
320 heat source side device
400 management server
500 user

The invention claimed is:

1. A system comprising:
a first user side device installed in a predetermined property of an air conditioner among a plurality of user side devices;
a remote controller adapted to connect communicatively with one or more of the plurality of the user side devices;
a terminal; and
a management server,
wherein the terminal is configured to display a screen that enables a user to select an address to be allocated to the first user side device, the screen including a plurality of candidates of a plurality of addresses, a display form of an address that has been set and a display form of an address yet to be set being displayed differently,
wherein the address selected on the screen is set to the remote controller,
wherein the remote controller receives information for identifying the first user side device from one or more user side devices installed in the predetermined property, and transmits the received information for identifying the first user side device remotely to the terminal,
wherein the terminal generates first information based on the information for identifying the first user side device from the remote controller and transmits the first information for identifying the first user side device installed in the predetermined property to the management server,
wherein the management server stores second information as information on a user side device to be installed in the predetermined property, and based on the first information and the second information received from the terminal, the management server determines whether the first user side device installed in the predetermined property matches the user side device to be installed in the predetermined property,
wherein the management server receives the first information for identifying the first user side device from the terminal, and determines (1) whether the first user side device of the air conditioner is correctly connected with the remote controller and (2) whether another user side device of the plurality of user side devices other than the first user side device incorrectly connects with the remote controller,
wherein, upon determining that the first user side device is correctly connected to the remote controller, a communication connection between the first user side device and the remote controller is enabled, and
wherein, upon determining that the first user side device is not correctly connected to the remote controller, or at least one of the another user side device of the plurality of user side devices is incorrectly connected to the remote controller, the management server causes the terminal to display an error.

2. The system as claimed in claim 1, wherein the information for identifying the first user side device is one of an appliance ID, a lot number, or a model name of the user side device.

3. A method executed by an air conditioning system, the method comprising:
displaying a screen of a terminal that enables a user to select an address to be allocated to a first user side device installed in a predetermined property among a plurality of user side devices, the screen including a plurality of candidates of a plurality of addresses, a display form of an address that has been set and a display form of an address yet to be set being displayed differently;
setting the address selected on the screen to a remote controller, the remote controller being adapted to connect communicatively with one or more of the plurality of the user side devices;
receiving, by the remote controller, information for identifying the first user side device from one or more user side devices installed in the predetermined property;
transmitting the received information for identifying the first user side device remotely to the terminal;
generating first information for identifying the user side device installed in the predetermined property from the terminal, wherein the first information is generated based on the information for identifying the first user side device;

receiving the first information for identifying the first user side device from the terminal by the management server;

determining whether the user side device installed in the predetermined property matches a user side device to be installed in the predetermined property, based on the first information received from the terminal and second information stored in a management server, the second information being information on the user side device to be installed in the predetermined property;

determining (1) whether the first user side device is correctly connected with the remote controller and (2) whether another user side device of the plurality of user side devices other than the first user side device incorrectly connects with the remote controller, enabling a communication connection between the first user side device and the remote controller upon determining that the first user side device is correctly connected to the remote controller, and causing the terminal to display an error upon determining that the first user side device is not correctly connected to the remote controller, or at least one of the another user side device of the plurality of user side devices is incorrectly connected to the remote controller.

* * * * *